United States Patent [19]

McGee et al.

[11] 4,197,888

[45] Apr. 15, 1980

[54] LOG CENTERING APPARATUS AND METHOD USING TRANSMITTED LIGHT AND REFERENCE EDGE LOG SCANNER

[75] Inventors: Arthur L. McGee, Lake Oswego; Robert A. Browning, Portland; Lewis M. Yock, Tigard, all of Oreg.

[73] Assignee: The Coe Manufacturing Company, Painesville, Ohio

[21] Appl. No.: 879,441

[22] Filed: Feb. 21, 1978

[51] Int. Cl.$^2$ ............................ B27L 5/02; G01B 9/02
[52] U.S. Cl. ............................ 144/209 A; 82/2.5; 82/45; 250/209; 250/560; 356/384; 356/385; 356/400; 364/475; 364/559; 144/323
[58] Field of Search ............. 235/103.5, 103; 356/167, 116, 160, 384, 385, 386, 387, 400; 250/209, 560, 206; 82/2.5, 45; 144/209 R, 209 A, 312, 323; 364/118, 469, 475, 559

[56] References Cited

U.S. PATENT DOCUMENTS

| | | |
|---|---|---|
| 1,523,786 | 1/1925 | Merritt . |
| 2,352,885 | 7/1944 | Bokowsky . |
| 2,441,925 | 5/1948 | Wege . |
| 2,523,503 | 9/1950 | Foreman . |
| 2,670,772 | 3/1954 | Hervey . |
| 2,756,627 | 7/1956 | Boycks . |
| 2,942,636 | 6/1960 | Meissner . |
| 3,036,607 | 5/1962 | Raura . |
| 3,037,538 | 1/1957 | Graham ........................ 144/209 A |
| 3,129,733 | 4/1964 | Dargan et al. . |
| 3,152,626 | 10/1964 | Nicholson . |
| 3,392,765 | 7/1968 | Brookhyser et al. . |
| 3,456,774 | 7/1969 | Blickenderfer et al. . |
| 3,459,246 | 8/1969 | Ottosson . |
| 3,504,719 | 4/1970 | Don . |
| 3,513,321 | 5/1970 | Sherman . |
| 3,519,045 | 7/1970 | Blickenderfer et al. . |
| 3,554,249 | 1/1971 | Arnelo . |
| 3,604,940 | 9/1971 | Matthews . |
| 3,619,065 | 11/1971 | Agnew . |
| 3,648,743 | 3/1972 | Fino et al. . |
| 3,658,428 | 4/1972 | Voigtlaender-Tetzner . |
| 3,664,395 | 5/1972 | Reed . |
| 3,724,958 | 4/1973 | Callan . |
| 3,736,968 | 6/1973 | Mason . |
| 3,746,065 | 7/1973 | Mason . |
| 3,749,500 | 7/1973 | Carlson et al. . |
| 3,752,201 | 8/1973 | Heth . |
| 3,760,855 | 9/1973 | Nilberg . |
| 3,781,115 | 12/1973 | Rader et al. . |
| 3,787,700 | 1/1974 | Chasson . |
| 3,806,253 | 4/1974 | Denton . |
| 3,842,874 | 10/1974 | Noriyuki et al. . |
| 3,852,579 | 12/1974 | Sohn et al. . |
| 3,856,411 | 12/1974 | Zanoni . |
| 3,856,412 | | Zanoni . |
| 3,870,890 | 3/1975 | Binks et al. . |
| 3,897,156 | 7/1975 | Chasson . |
| 3,902,539 | 9/1975 | Kettler . |
| 3,981,016 | 9/1976 | Iwata et al. . |
| 3,983,368 | 9/1976 | Csakvary et al. . |
| 3,992,615 | 11/1976 | Bennett et al. . |
| 4,115,702 | 9/1978 | Nopper ........................... 356/384 |
| 4,131,365 | 12/1978 | Pryor ............................. 356/400 |

FOREIGN PATENT DOCUMENTS

| | | |
|---|---|---|
| 5786 | 8/1956 | Fed. Rep. of Germany ...... 144/209 A |
| 29429 | 12/1957 | Finland .................................. 144/209 X |
| 619157 | 3/1961 | Italy ....................................... 144/209 A |
| 1086450 | 10/1967 | United Kingdom . |

Primary Examiner—R. L. Spruill
Assistant Examiner—W. D. Bray
Attorney, Agent, or Firm—Klarquist, Sparkman, Campbell, Leigh, Hall & Whinston

[57] ABSTRACT

A log centering apparatus and method are described employing an optical log scanner for determining the longitudinal axis of the log for optimum wood product production by transmitting light to detectors through the space between the side of such log and reference edge members. The detectors each include a linear array of photosensitive diodes which are electronically scanned to take a reading. Before scanning, rough centering arms clamp the log and its opposite ends are engaged by rotation spindles. The log may be rotated intermittently or continuously during scanning to measure at different angles the distance between the reference edge and the surface of the log at a plurality of points spaced longitudinally along the log. These distance signals are fed to an electronic computer to compute the optimum yield axis of such log. The spindles on which the log is rotated are moved horizontally and vertically after determination of its optimum axis, to reposition the log until such optimum axis is in alignment with a reference axis, spaced a predetermined distance from a work axis, such as the lathe of a veneer lathe. The preferred embodiment of the invention is a veneer lathe charger. After repositioning the log in alignment with the reference axis, such log is reclamped and held while the spindles are removed so that the ends of the logs can be engaged by pivoted pendulum-like transfer arms which transfer the log from such reference axis to alignment with the lathe axis.

23 Claims, 11 Drawing Figures

LOG CENTERING APPARATUS AND METHOD USING TRANSMITTED LIGHT AND REFERENCE EDGE LOG SCANNER

BACKGROUND OF INVENTION

The subject matter of the present invention relates generally to a method and apparatus for determining the optimum yield axis of a log and centering such optimum axis on a reference axis by means of an optical log scanner which transmits light to detectors between the side of the log and a reference edge. In particular, the invention relates to such an apparatus and method used in a veneer lathe charger for centering the log in alignment with a reference axis and transfering it from the reference axis to the veneer lathe axis by a pair of pivoted pendulum-like transfer arms. However, the present invention can also be used for other purposes such as in a sawmill for sawing the log into boards in a predetermined pattern after the maximum yield axis has been determined. In the present invention, adjustable reference edge means are provided at positions along the log spaced a predetermined distance from the reference axis. Light is transmitted through the space between the side of the log and such reference edge means to detectors which may each include a fixed linear array of photosensitive diodes that are electronically scanned to take a reading. The distance between such reference edge means and the surface of the log is measured by the optical scanner at different angles of rotation of the log and such distance signals are fed to an electronic computer to determine the optimum yield axis of the log.

Previously, the optimum yield axis of a log has been measured by using transmitted light optical scanners, as shown in U.S. Pat. No. 3,736,968 of H. G. Mason et al, granted June 5, 1973, U.S. Pat. No. 3,746,065 of H. G. Mason, granted July 17, 1973 and in U.S. Pat. No. 3,902,539 of O. Ketteler, granted Sept. 2, 1975. However, unlike the present invention none of these patents discloses the idea of transmitting light between a reference edge means and the side of the log to measure the distance from such reference edge to the log surface. In addition, there is no indication that the log should be rotated during scanning for determining its optimum yield axis and the log repositioned by moving the scanning spindles vertically and horizontally in response to a control signal produced by the scanner to align the optimum axis of the log with the reference axis in the manner of the present invention. Further, there is no disclosure of using pivoted pendulum-type transfer arms to engage the ends of the log axis after the log has been repositioned, reclamped and the spindles removed, for transferring the log from the reference axis to a veneer lathe in the manner of the present invention.

It is indicated in U.S. Pat. No. 3,852,579 of F. Sohn et al, granted Dec. 3, 1974, that it is desirable to reposition the spindles of a lathe charger after the optimum axis of the log is determined by an optical scanner during continuous rotation of the log. However, unlike the present invention this prior apparatus employs a light reflection scanner, rather than a light transmission scanner, which detects light reflected from the surface of the log. In addition, this prior apparatus does not employ a reference edge means along the side of the log together with a light transmission scanner in order to measure the distance between the log and such reference edge means which is spaced a predetermined amount from the reference axis in the manner of the present invention. In addition, there is no use of pivoted pendulum-type transfer arms for engaging the ends of the log and moving it from the reference axis to the veneer lathe axis. Finally there is no clamping means for reclamping the log after it is repositioned at the reference axis and holding such log while the scanning spindles are removed and the transfer arms engage the log in the manner of the present invention.

It is known from U.S. Pat. No. 3,392,765 of B. B. Brookhyser et al, granted July 16, 1968, to provide a veneer lathe charger with a log lowering device and a releasable clamping means formed by three clamp arms. However, this patent does not disclose the use of any type of optical scanning after clamping, much less light transmission scanning with a reference edge means, for determining the optimum yield axis of the log and repositioning the optimum axis of the log in alignment with a reference axis. Neither does it show the use of pivoted pendulum-type transfer arms for transfering the log from the reference axis to the veneer lathe axis. U.S. Pat. No. 3,787,700 of L. H. Chasson, granted Jan. 22, 1974, does show it is old to use a linear area of photosensitive diodes as a detector in an optical scanner for measuring the diameters of logs. However, it is not employed in a light transmission optical scanner with a reference edge means.

The log centering apparatus of the present invention has many advantages over those shown in the above-described patents including a simpler and more accurate optimum yield axis measurement apparatus using a light transmission optical scanner and linear diode array detector of faster readout time with a reference edge means which is not sensitive to detector movement due to machine vibration, etc. Furthermore, the present lathe charger apparatus provides a completely automatic apparatus for determining the optimum yield axis of the log, repositioning the log to move such optimum axis into alignment with a reference axis and transferring the log from such reference axis to the veneer lathe axis.

SUMMARY OF THE INVENTION

One object of the present invention is to provide an improved log centering apparatus and method for determining the optimum yield axis of the log in a simple, quick and accurate manner.

Another object of the invention is to provide such a log centering apparatus and method employing a light transmission type optical scanner with a reference edge means spaced from the side of the log and located in the light path to the light detector so that the scanner measures the log axis in a more accurate and stable manner and is not sensitive to movement of the light detector due to machine vibration and the like.

A further object of the invention is to provide such a log centering apparatus and method which is capable of scanning the log for measuring its spacing from the reference edge at a plurality of angular positions longitudinally spaced along the log and determining its optimum yield axis in a much shorter time.

An additional object of the invention is to provide such a log centering apparatus in an improved veneer lathe charger which automatically determines the optimum yield axis of the log, repositions the log with its optimum yield axis in alignment with a reference axis, and transfers the log from such reference axis to the lathe axis.

Still another object of the invention is to provide such a veneer lathe charger apparatus in which the log is clamped in a rough centered position before engagement by spindles for rotation scanning, and is reclamped after it is repositioned with its optimum yield axis in alignment with the reference axis before the scanning spindles are removed and the ends of the log are engaged by transfer arms which pivot the log from such reference axis to the lathe axis.

A still further object of the invention is to provide such a veneer lathe charger apparatus in which the log is repositioned by moving the scanning spindles horizontally and vertically in an accurate manner.

Another object of the invention is to provide such a lathe charger apparatus in which the transfer arms are provided with arcuate gripping means which enable the lathe spindles to engage the end of the log by extending through such gripping means as they hold the log with its optimum yield axis in alignment with the lathe axis.

DRAWINGS

Other objects and advantages of the present invention will be apparent from the following detailed description of a preferred embodiment thereof and from the attached drawings, of which.

DESCRIPTION OF PREFERRED EMBODIMENT

Figure 1:
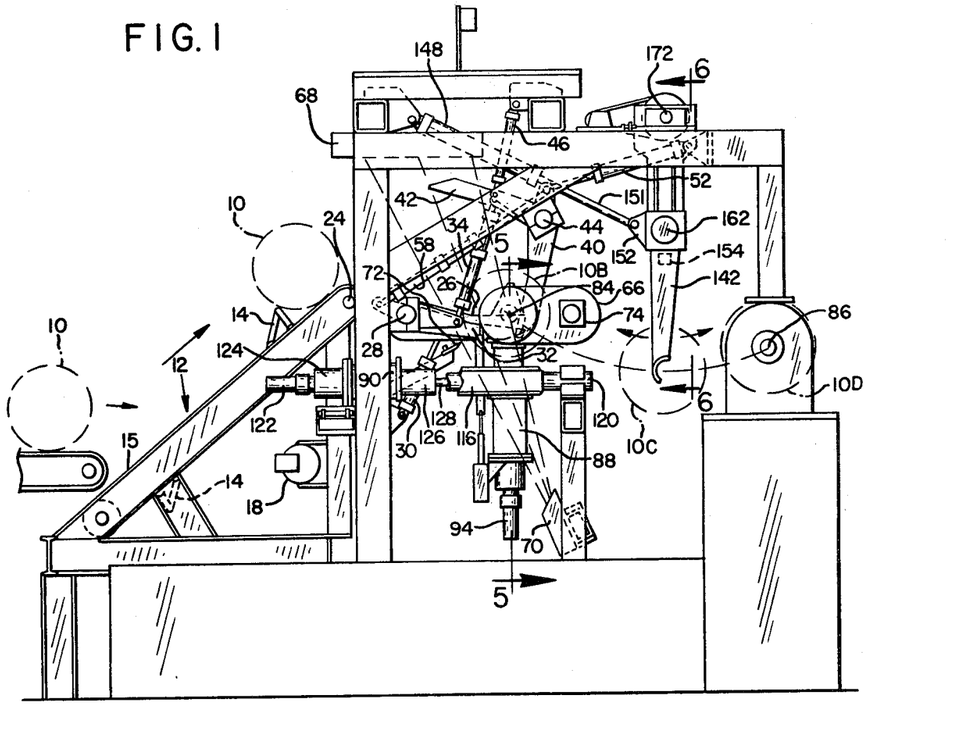
FIG. 1 is a side elevation view of a veneer lathe charger made in accordance with the present invention with part of the horizontal adjustment means broken away for clarity.
Figure 2:
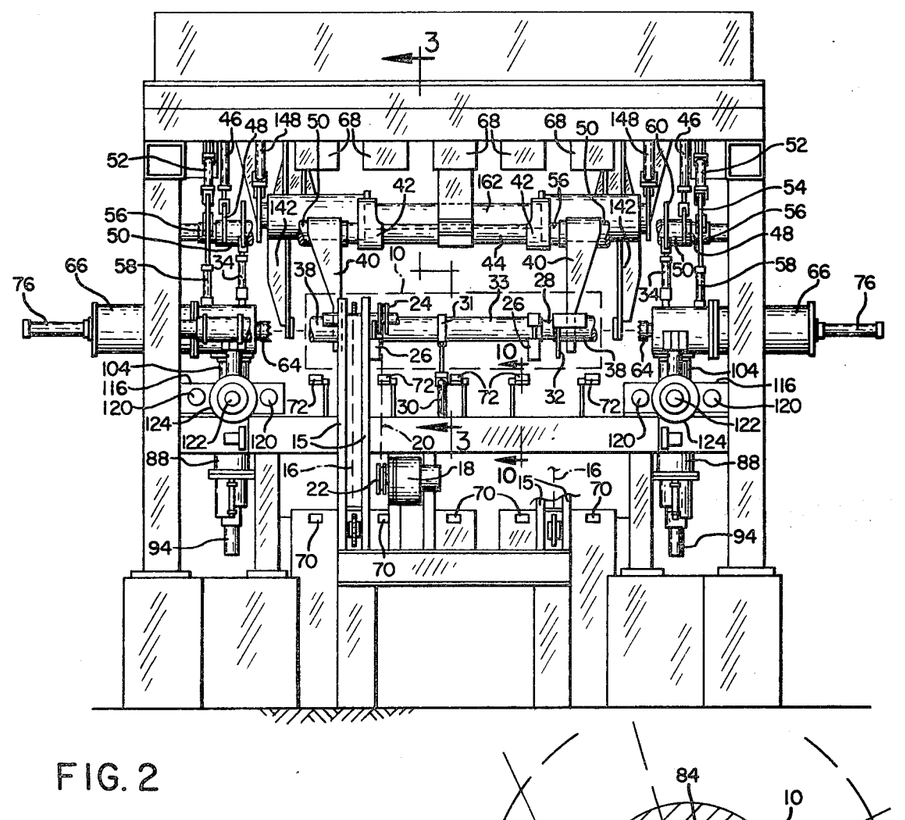
FIG. 2 is a front elevation view of FIG. 1 with parts broken away for purposes of clarity.

As shown in FIG. 1, a log 10 whose longitudinal axis for optimum yield is to be determined by the log processing apparatus and method of the present invention is first loaded onto a chair-lift type conveyor 12 having at least two lifting chairs 14 attached to each of the pair of conveyor chains 16. The logs are supported on a pair of support rails 15 forming a ramp up which the logs are conveyed by the conveyor chairs. The conveyor chairs are driven by a hydraulic drive motor 18 and coupling chains 20 extending between the output 22 of such drive motor and the top pulley 24 of the conveyor as shown in FIG. 2. When the logs reach the top of the conveyor they trip a limit switch to stop the conveyor. A pair of log lowering arms 26 receive the logs from the conveyor and pivot about a shaft 28 adjacent the top of the conveyor to lower the log from the initial receive position 10A of FIG. 3 to an intermediate position between positions 10A and 10B where it is engaged by the centering and clamp arms. The lowering arms 26 are automatically pivoted upward from the dashed line position shown in FIG. 3 into a raised position before the logs reach the top of the conveyor to receive the logs from such conveyor.

Figure 4:
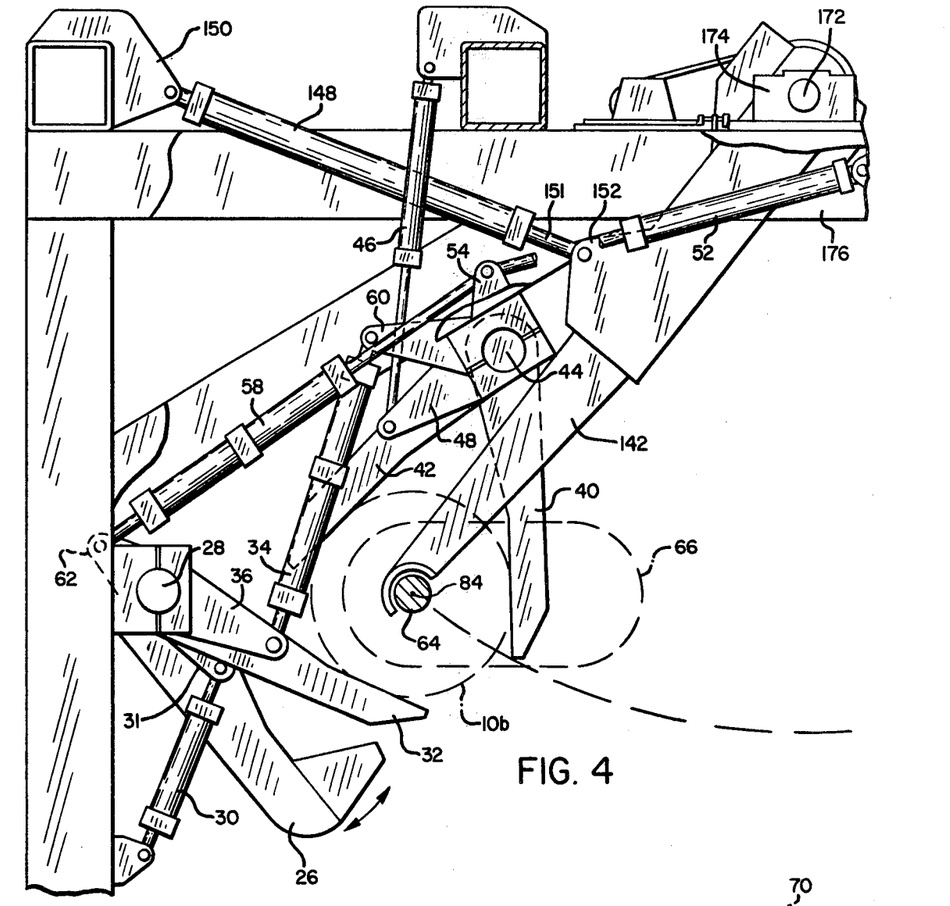
FIG. 4 is an enlarged view of a portion of FIG. 3 with the log shown in a centered position.

The logs are lowered by lowering arms 26 onto a pair of lower clamp arms 32 which pivot about shaft 28. The lower clamp arms 32 are each supported in a raised position by a double-ended fixed link cylinder 34 connected by a link 36 to an outer sleeve 38 on the shaft 28. The clamp arms 32 are secured to the two outer sleeves 38 for pivotal movement therewith. The block lowering cylinder 30 is connected by a link 31 to a middle sleeve 33 to rotate such sleeve about shaft 28 and thereby pivot the lowering arms 26 connected to such sleeve. A pair of upper clamp arms 40 and a pair of pressure clamp arms 42 are pivoted about a common support shaft 44 to clamp the log between such clamp arms and the lower clamp arms 32 in the rough centered position 10B of the log, as shown in FIG. 4.

The upper clamp arm 40 is pivoted by a centering cylinder 46 whose piston is attached to a link 48 which is connected to a sleeve 50 to which the clamp arm 40 is attached for pivoting about shaft 44. The pressure clamp arm 42 is pivoted by a pressure cylinder 52 whose piston is connected to a link 54 which is attached to an inner sleeve 56 to which the pressure arm 42 is connected for pivoting about the shaft 44. The upper and lower clamp arms 40 and 32 are moved into engagement with the log by the centering cylinder 46 and the following action of the fixed link cylinder 34 which causes the lower arm 32 to move approximately equally and oppositely to upper arm 40 to which it is connected at link 60. A slip link cylinder 58 which is double-ended, is connected between the pressure arm 40 at link 54 and the lower clamp arm 32 at link 62. In order to cause the three clamp arms to geometrically center the log at position 10B, hereafter called "rough centering," the pressure clamp arm 42 is moved inward by pressure cylinder 52 and overcomes the cylinder 46 to force the upper and lower clamp arms 40 and 32 apart until the maximum limit of travel of the slip link cylinder 58 is reached, such slip link cylinder also acting like a shock absorber. Thus, bottoming out of the slip link cylinder 58 prevents further closing of the pressure arm 42 and establishes the log at position 10B whose center corresponds to the reference axis 84. This clamping and rough centering is described in U.S. Pat. No. 3,392,765 of Brookhyser et al. It should be noted that there are two sets of clamp arms at the opposite ends of the log that operate independently of each other which is necessary for tapered logs whose opposite ends are of different diameters. However, the optimum yield axis of the log often is different from the rough center axis because of defects or other changes in the configuration of the log at points displaced from the clamp arms.

After rough centering the log between the clamp arms 32, 40 and 42, the opposite ends of the log are engaged by rotation spindles 64 normally aligned with the reference axis 84. One of these spindles is driven by motor means 66 to rotate the log after the clamp arms have been released in the rough centered position 10B of the log, as shown in FIG. 4. The motor means 66 includes an electrical step motor which causes the spindles to be rotated precisely through one revolution. During rotation of the log, it is scanned by transmission-type optical scanners, including a plurality of light sources 68 and a plurality of light detectors 70 spaced longitudinally along the log along with a plurality of adjustable reference edge members 72 spaced laterally from the side of the log. The optical scanners are employed to scan the log for determination of its optimum yield axis. In the embodiment of FIGS. 1 and 2 there are five light sources 68 and associated light detectors 70 along with five adjustable reference edge members 72 which provide five sets of log to reference edge distance readings at five different longitudinal positions. Each set of readings includes 24 readings for every 360° rotation of the log, a different reading being taken every 15° or so of rotation of the log. The angular position of the log at each of such readings is indicated by the digital output signal of a shaft encoder 74 connected to the output shaft of the spindle drive motor 66, as shown in FIG. 1. The spindles 64 are moved into and out of engagement with the log by two hydraulic cylinders 76 connected to the shafts of such spindles, as shown in FIGS. 2 and 5.

Figure 8:
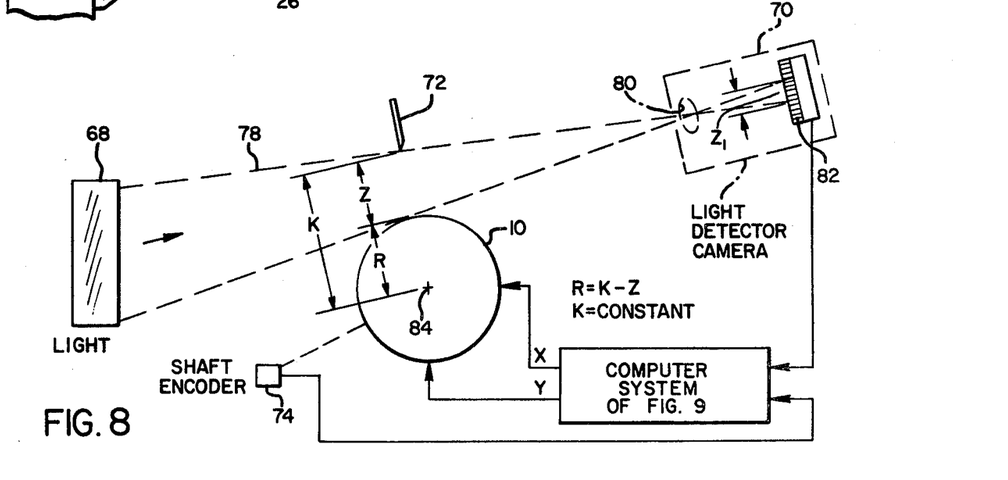
FIG. 8 is a schematic diagram of the light transmission type optical scanner used in FIG. 1 to determine the optimum yield axis of the log.

As shown in FIG. 8, each of the lights 68 transmits a light beam 78 through the space between the reference edge member 72 and the side of the log 10 to produce a transmitted light image of the gap extending from the shadow of the reference edge member to the shadow of the side of such log. This transmitted light image is detected by the light detector 70. The light detector 70 may be a photoelectric camera including a lens 80 positioned at the focal point of the light beam 78 and a linear array 82 of photoelectric semiconductor devices, such as diodes. The longitudinal axis of the array 82 is aligned with the spacing distance, Z, between the reference edge 72 and the side of the log, so that such spacing distance is proportional to the exposed length, $Z_1$, of the array which the projected light beam covers. This distance, $Z_1$, is determined by the number of diodes in the array which are illuminated by the light beam so they produce an electrical output signal when the array is scanned electronically. One suitable photodetector camera employing such a linear diode array is one which employs a linear diode array of 1.024 inches in length with 512 diodes in the array.

The reference edge members 72 are adjustable so that they may be positioned a constant distance, K, from the reference axis 84. The reference axis is located a predetermined arcuate distance from a work axis 86 which may be the lathe axis of a veneer lathe being loaded by the log processing apparatus of the present invention, so that a log centered on such reference axis will automatically be aligned with the lathe axis after transfer to such lathe in a manner hereafter described. By measuring the spacing distance, Z, the reference distance, R, from the reference axis 84 to the measured surface of the log can be calculated by the formula $R = K - Z$. Of course, the reference distance, R, varies with the angular position of the log 10 because the log is not exactly circular. However, by taking 24 readings of the spacing distance, Z, or one reading every 15° of rotation, a maximum yield axis of the log can be calculated by an electronic computer. Once this is done, the log is moved to align its maximum yield axis with the reference axis 84 by movement of the spindles 64 in the horizontal and vertical direction response to x and y control signals produced by the computer. It should be noted that it only requires one complete revolution of the log 10 in about 1.25 seconds to obtain these 24 readings.

Figures 5, 11:
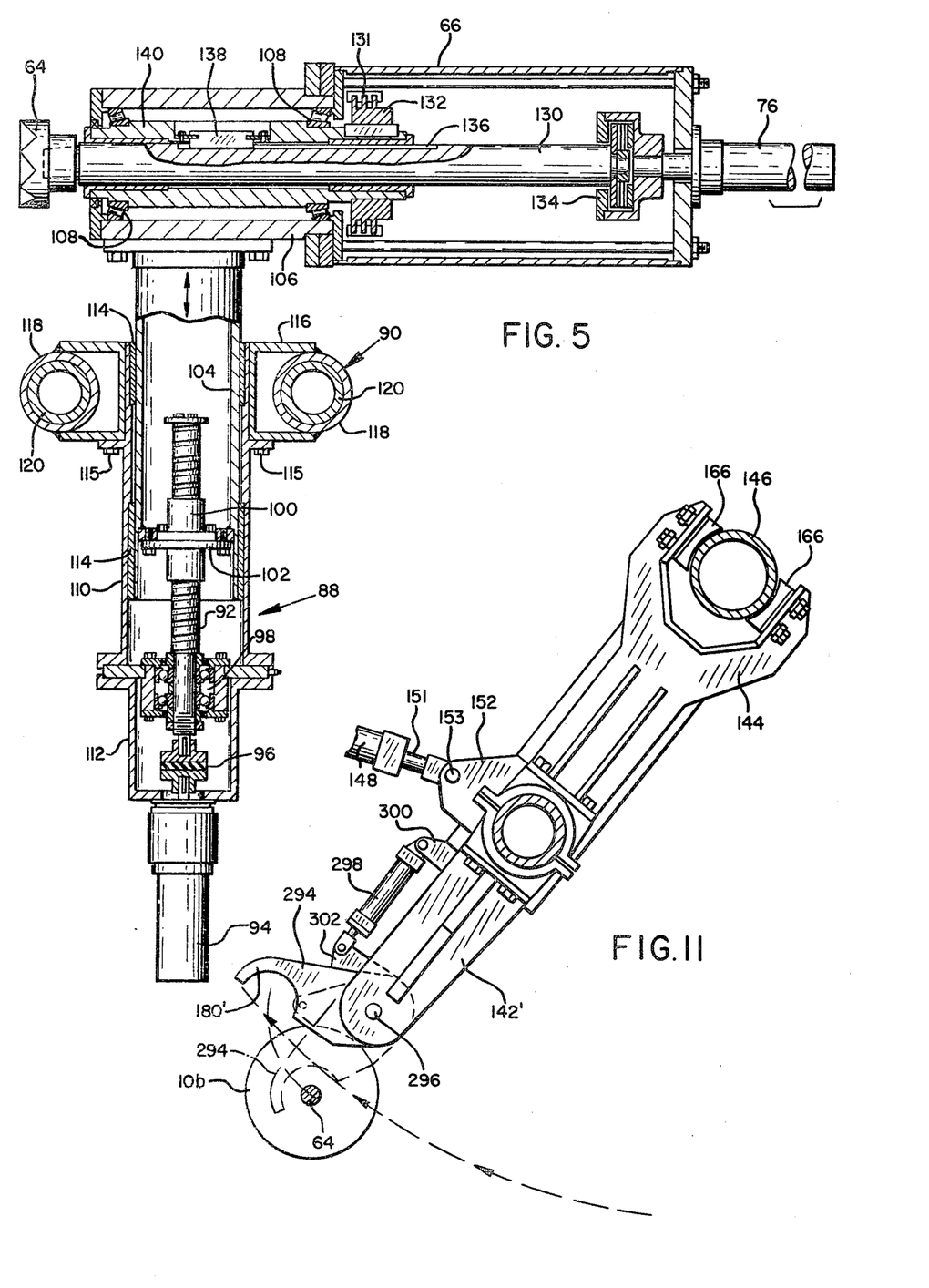
FIG. 5 is an enlarged vertical section view of the scanning spindle mechanism and the horizontal and vertical adjusting mechanism taken along line 5—5 of FIG. 1.
FIG. 11 is an elevation view of another embodiment of the transfer arms.

FIG. 5 shows the spindle centering apparatus for horizontal and vertical adjustment of each of the spindles 64 by a vertical adjustment means 88 and a horizontal adjustment means 90. The vertical adjustment means 88 includes a jack screw shaft 92 which is rotated by a motor means 94 attached to the end of the shaft by a coupling 96. The jack screw shaft 92 is mounted for rotation within two vertically spaced ball bearings 98 and extends through a traveling jack member 100 which is moved up and down vertically by rotation of the jack screw. The motor means 94 includes an electrical stepping motor which is rotated a precise amount in accordance with the vertical adjustment control signal output of the computer to raise the jack member 100 a distance corresponding to the vertical adjust distance of the corresponding spindle 64 in a manner hereafter described in reference to FIG. 9. The tubular jack member 100 is bolted to a mounting plate 102 which in turn is bolted to a vertical adjustment tube 104. The upper end of tube 104 is bolted to a spindle housing 106 containing two horizontally spaced spindle bearings 108. The vertical adjustment tube 104 is mounted for telescoping movement within an outer tube 110 which is fixed in position and includes a lower end portion 112 surrounding the bearings 98 and coupling 96. Two bearing sleeves 114 of a suitable low friction material are provided on the inner surface of tube 104 to enable sliding movement between tubes 104 and 110. Thus, rotation of the jack screw 92 causes vertical movement of the jack member 100, adjustment tube 104 and housing 106 for vertical adjustment of spindle 64.

Horizontal adjustment of spindle 64 perpendicular to the axis of such spindle is achieved by mounting the outer tube 110 with bolts 115 to a horizontal carriage member 116 including a pair of guide sleeves 118 positioned on opposite sides of the outer tube. The carriage sleeves 118 slide horizontally along tubular guide members 120 extending through such sleeves when the carriage is moved by a horizontal jack screw in a manner hereafter discussed. As shown in FIGS. 1 and 2, a motor means 122 including an electrical stepping motor is connected to a horizontal jack screw shaft contained within an outer tube 124 and extending through a traveling jack member (not shown) like shaft 92 and jack member 100 of FIG. 5. The traveling jack member is connected to an inner tube 126 which slides within outer tube 124 and is attached at one end to the carriage 116 for horizontal adjustment of the carriage and spindle 64. The end of the horizontal adjustment tube 126 is attached by a connecting rod 128 to carriage 116 for movement of such carriage with such adjustment tube in response to rotation of the jacket screw by motor 122 as shown in FIG. 1. The carriage 116 supports the outer tube 110 of the vertical adjustment means 88 so that such outer tube, inner tube 104, spindle housing 106 and spindle 64 all move horizontally with such carriage.

As shown in FIG. 5, the spindle 64 is attached to the end of a spindle shaft 130 which is coupled by means of connecting chains 131 and sprockets 132 to the spindle motor 66 of FIG. 1 for rotation of the spindle. The spindle 64 is extended horizontally into contact with the end of a log and retracted out of engagement with such log by means of cylinder 72 which is connected to the shaft 130 by a conventional rotatable coupling 134. Coupling 134 permits rotation of shaft 130 while transmitting longitudinal movement of the cylinder 36. A keyway slot 136 is provided in shaft 130 and mates with a key 138 attached to a bearing sleeve 140 which is rotated by pulley 132. The key permits longitudinal movement of the shaft and couples it to sleeve 140 for rotation of the shaft after such longitudinal movement. It should be noted that bearing sleeve 140 rotates with shaft 130 relative to housing 106 on the spindle bearings 108.

Figure 3:
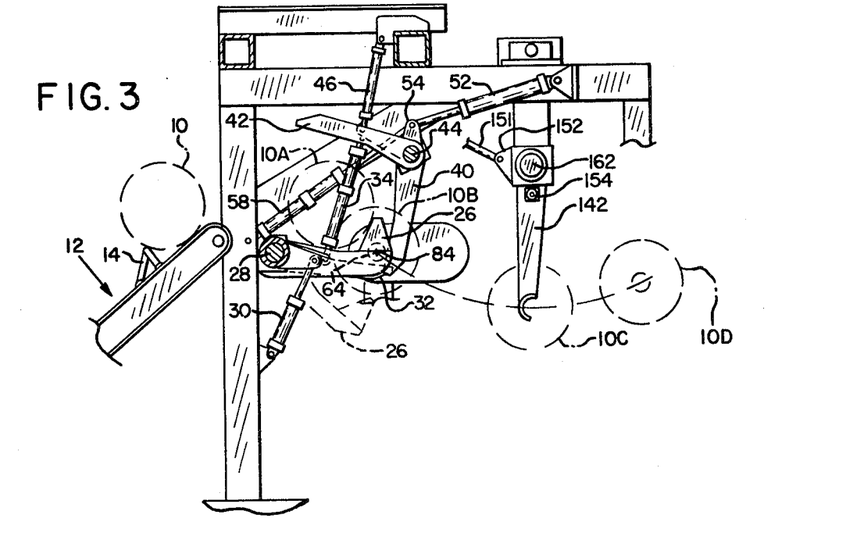
FIG. 3 is a vertical section view taken along line 3—3 of FIG. 2 before the log is clamped for rough centering.

After the spindles 64 are adjusted horizontally and vertically by means 88 and 90 so that the maximum yield axis of the log is in alignment with the reference axis 84 in position 10B as shown in FIG. 4, the log is transferred from position 10B to a position 10D of FIGS. 1 and 3, where such maximum yield axis is in alignment with the lathe axis 84 of the veneer lathe. This transfer of the log is accomplished by a pair of transfer arms 142 which engage the ends of the log in position 10B. Before the transfer arms 142 engage the opposite ends of the log and after the log is centered on axis 84, the log is reclamped in order to maintain it in such centered position between clamping arms 32, 40 and 42. Then the spindles 64 are disengaged from the ends of the log to make room for the transfer arms which then engage the log ends.

Figures 6, 7:
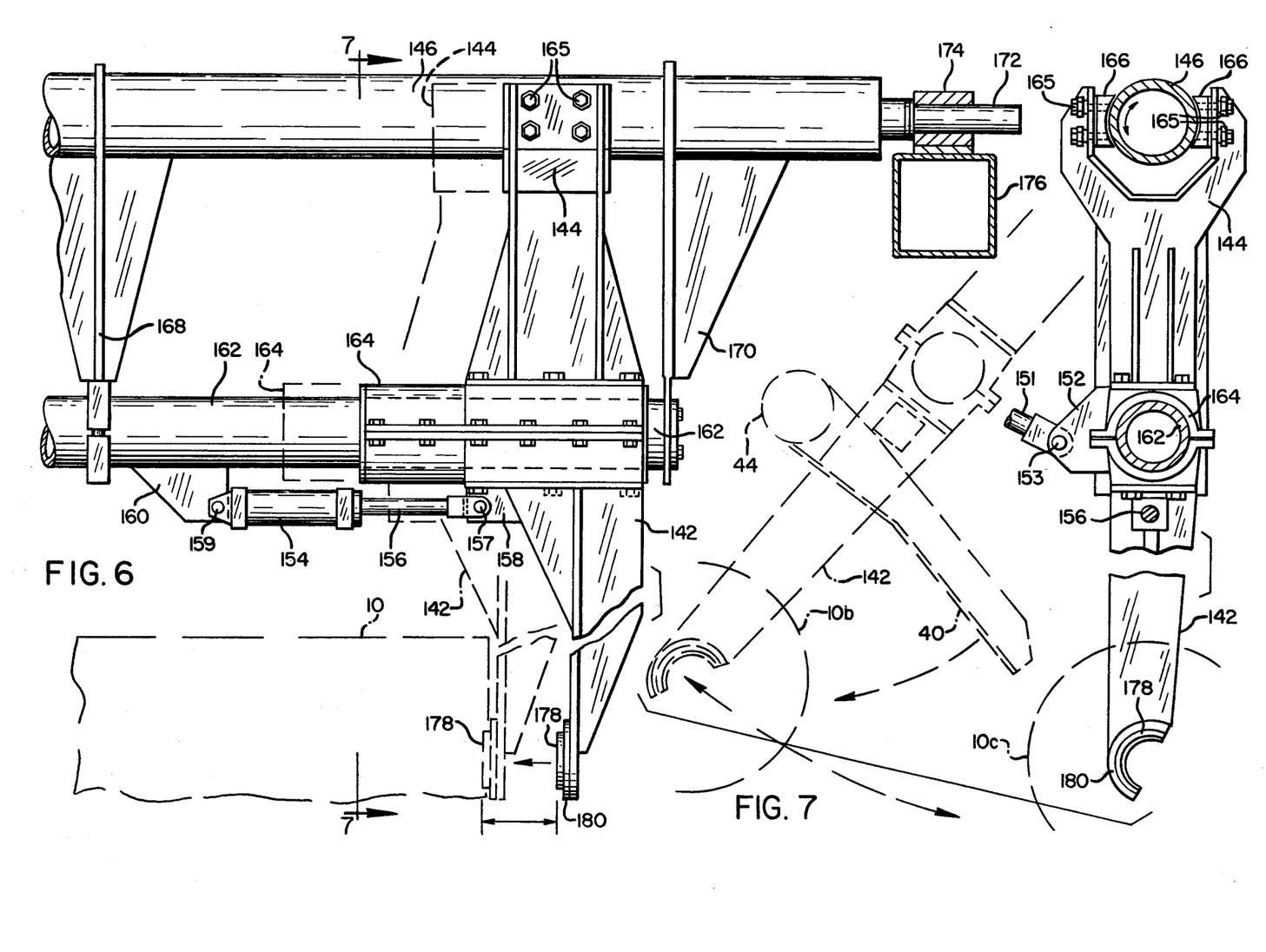
FIG. 6 is an enlarged rear elevation view of one of the transfer arms taken along line 6—6 of FIG. 1.
FIG. 7 is a vertical section view taken along line 7—7 of FIG. 6 showing the transfer arms moving between an intermediate transfer position and a clamped position shown in dashed lines with the clamp arm outlined in dashed lines.

As shown in FIGS. 6 and 7, each of the transfer arms 142 is pivotally mounted at one end by a U-shaped support member 144 on a tubular support shaft 146. The transfer arms and support shaft 146 are pivoted about the axis of such shaft by means of a transfer cylinder 148, as shown in FIG. 4. One end of the transfer cylinder is pivotally attached to a support bracket 150 fixed to the frame of the charger apparatus and its piston rod 151 at the other end of such cylinder is pivotally attached at pivot 153 to an ear projection 152 on the transfer arm 142. In order to move the transfer arms 142 longitudinally into and out of engagement with the end of the log, a gripping cylinder 154 is provided whose piston rod 156 is attached at pivot 157 to a projection 158 on the transfer arm. The opposite end of the cylinder 154 is attached at pivot 159 to a projection 160 fixed to a guide shaft 162. The transfer arm 142 is attached to the guide shaft 162 by a guide member 164 which is made in two semicircular parts that are bolted around the guide shaft. As a result, longitudinal movement of the transfer arms 142 relative to the log is achieved by means of cylinder 154 is both rotational positions 10B and 10D since the guide member 164 slides along guide shaft 162 between the solid line position and the dashed line position of FIG. 6. It should be noted that the pivoted support arm 144 is fastened by bolts 165 to a pair of arcuate bearing members 166, which enable longitudinal movement of such pivoted members along support shaft 146 while also supporting the transfer arm on such support shaft.

The guide shaft 162 is secured to the support shaft 146 by support arms 168 and 170 for pivotal movement of such support shaft in response to pivoting of the guide shaft by cylinder 148 and 151. The support shaft 146 is hollow and is attached at its opposite ends to a solid shaft 172 of smaller diameter. The shaft 172 extends through a rotary bearing 174 mounted on a fixed rectangular beam 176 of the frame.

Each of the transfer arms 142 is provided with an arcuate knife edge portion 178 for engagement with the end of the log. The knife edge portion is provided on a semicircular ring 180 at the end of the transfer arm and extends through an arc of approximately 180°. This arcuate end ring 180 is provided with a sufficiently large inner diameter to enable the lathe spindles 86 to be inserted through such ring into engagement with the ends of the log while such log is still held between the transfer arms in position 10D. It should be noted that the transfer arms are shown in an intermediate position 10C in FIGS. 5 and 6 after they have released the log and are returning from position 10D to position 10B.

Figure 9:
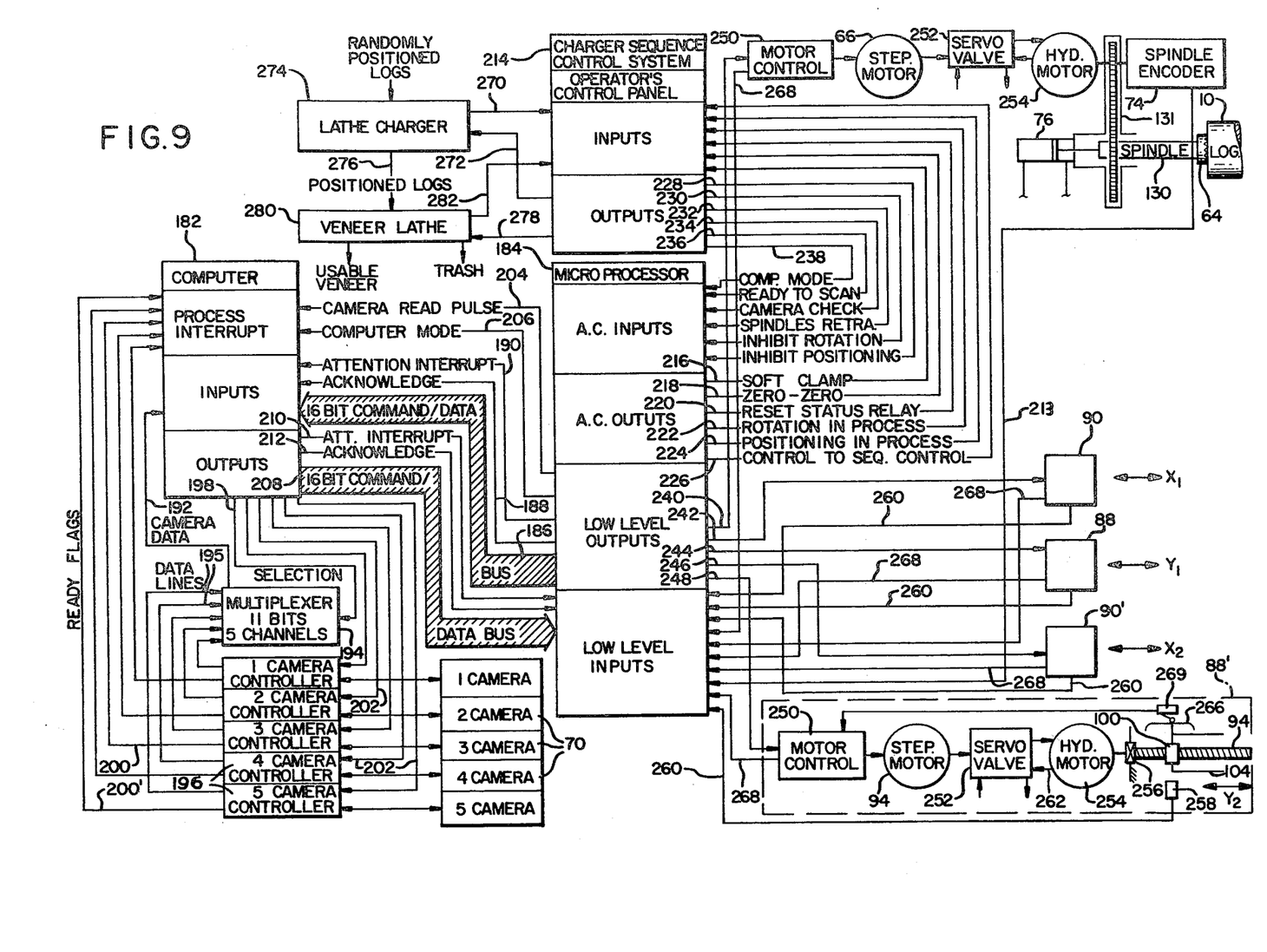
FIG. 9 is a block diagram of the optimum yield axis measurement and log centering system of the present invention including the computer and control circuits.

As shown in FIG. 9, the optimum yield axis measurement and log centering system of the present invention includes a general purpose digital computer 182, such as an IBM System 7 computer, having its input section connected to a low level output section of a smaller computer or microprocessor 184 through a 16-bit digital Command/Data Bus line 186 and through an Acknowledge line 188 and an Attention Interrupt line 190. In addition, the computer 182 has another input provided by a digital camera data line 192 connected from the output of a multiplexer 194. The multiplexer includes five input channels having their inputs connected through data lines 195 to the outputs of five camera controllers 196 whose inputs are connected to each of the five cameras providing the photosensitive light detectors 70. Each of the cameras produces a camera data signal corresponding to the distance, Z, between the log and the reference edge member 72 associated with such camera, as shown in FIG. 8. These camera data signals are selectively applied to the input line 192 of the computer 182 by the multiplexer 194 in accordance with a selection signal on selection line 198 connected between the output section of computer 182 and the multiplexer.

The five camera controllers 196 each have a control output line 200 which is connected to the Process Interrupt section of the computer 182 to provide a camera data Ready Flag signal to the computer to tell the computer when new camera data is ready to be fed to its input 192. The camera controllers are each provided with camera update input lines 202 to cause such controllers to terminate the previous camera data signal and to ready it for a new camera data signal corresponding to a new Z distance measurement. A Camera Read pulse is transmitted through line 204 from a low level output section of the microprocessor 184 to the Process Interrupt section of the computer 182 to initiate the reading of new camera data into the computer. A Computer Mode signal line 206 connected from the low level output section of microprocessor 184 to the Process Interrupt section of computer 182 sets the automatic mode of operation using the computer so that scanning, computing, etc. become part of the automatic cycle. The computer 182 stores the camera data taken by each camera for each 15 degree measurement position and uses this data to calculate the maximum yield axis of the log. The x and y coordinates of the two opposite ends of this maximum yield axis are determined by the computer and fed from its output section to the low level input section of the microprocessor.

The output section of the computer 182 provides a 16-bit digital Command/Data Bus signal over line 208 which is connected to the low level inputs of the microprocessor along with an Attention Interrupt line 210 and an Acknowledge line 212. The low level input section of the microprocessor 188 is also connected to an input line 213 from the shaft encoder 74 of the log spindle shaft 130. The shaft encoder 77 sends one pulse along line 213 for each ½ degree of spindle shaft rotation to the microprocessor. The microprocessor counts the encoder pulses and at a preset angle increment of, for example 15°, it sends a camera read pulse through line 204 to the Process Interrupt of the computer 184 to cause camera data to be read into camera controllers 196. At the same time the microprocessor also resets the counter in the input section of the microprocessor connected to line 213. The computer checks the validity of the camera read pulse and then sends camera update pulses through lines 202 to all of the five camera controllers 196. Upon receipt of the update pulse, each camera controller captures the next camera data reading in about one to two milliseconds. The controllers each send a camera data Ready Flag signal over lines 200 to the Process Interrupt section of the computer. Then the camera controllers apply the camera data through the data lines 195 to the multiplexer 194. Next, the computer sends a camera selector signal through line 198 to the multiplexer for each data Ready Flag signal received to transmit the camera data through input line 192 to the computer. The computer then stores the camera data and thereafter clears the multiplexer channel selector signal output 198.

The microprocessor 184 is controlled by a charger sequence control system 214 which includes an operator's control panel for manual control. The control system also includes an automatic control input section having six inputs connected to the A.C. output section of the microprocessor and including a Soft Clamp line 216, a Zero-Zero line 218, a Reset Status Relay line 220, a Rotation In Process line 222, a Positioning in Process line 224, and a Control to Sequence Control line 226. The sequence control system 214 also has six outputs connected to the A.C. input section of the microprocessor including an Inhibit Positioning line 228, an Inhibit Rotation line 230, a Spindle Retracted line 232, a Camera Check line 234, a Ready to Scan line 236 and a Computer Mode line 238.

The computer controlled portion of the charger cycle is generally considered as a special case of automatic, geometric type centering. A control window exists between geometrically centering the block between the spindles and the full retract of the pendulum assembly that transfers the block to the lathe.

The charger sequence control system 214 is designed such that computer mode can be set up at any time. It is also designed such that computer mode can be canceled at any time. If the cancellation occurs during the computer controlled portion of the cycle, it will automatically convert to geometric centering only—and it will do that without losing control of the block that may be in process.

The initiation of computer mode occurs with the computer directing the microprocessor to reset the status relay. The microprocessor resets the status relay by generating a pulse at output 220 to reset a time delay relay in the charger sequence control. This process must be periodically repeated in order to keep the time delay set.

A light on the operator's control panel of the sequence control system 214 is illuminated whenever the status relay is set. This light tells the operator that the computer and microprocessor are both operating and that computer operation is possible. If the operator wants to go into computer mode, he depresses the pushbutton that initiates and holds the computer mode signal at output 238 to the microprocessor. It will stay in computer mode until it is manually turned off by the operator by either depressing the computer mode off pushbutton or the manual mode pushbutton, or by the status relay opening because of its not having received a timely reset pulse.

The Ready to Scan signal at output 236 to the microprocessor is automatically generated by the sequence control system at the point in the computer mode where the log is held in the chucks of the charger spindles and when all clamp arms are off the log. Upon receipt of the Ready to Scan signal, the microprocessor is free to rotate the log.

The camera check signal at output 234 from the sequence control system to the microprocessor is generated at a point in the cycle at which no log is in the view of the cameras 70. This is used by the computer to check camera performance at a standard condition, if desired.

The spindles retracted signal at output 232 is used by the microprocessor to initiate the Zero-Zero operation. Normally, the spindles are retracted after the log has been positioned with its optimum yield axis in alignment with the reference axis and reclamped. The Zero-Zero operation returns the vertical and horizontal adjustment drives 88, 88', 90 and 90' to the reference or starting position.

The Inhibit Rotation signal at output 230 is sent to the microprocessor to prevent rotation of the spindles whenever it would not be safe to rotate the log. This is a safety interlock. The Inhibit Positioning signal at output 228 is also a safety interlock to prevent movement of the horizontal and vertical adjustment drives.

Similarly, the Rotation in Process signal at output 222 and Positioning in Process signal at output 224 from the microprocessor to the charger sequence control system are used for safety interlocks.

Soft Clamp signal at output 216 is generated when the computer is ready to have the log reclamped. Normally, this is generated after positioning of the log in alignment with the reference axis at the end of rotation.

The Zero-Zero signal at output 218 is used by the charger sequence control to inhibit spindle extension unless they are on the reference axis.

The Control to Sequence Control signal at output 226 is formal notification that the charger sequence control can continue its automatic operation by fully retracting the transfer arms to pick up the log that had just been processed.

The microprocessor 184 provides five motor control outputs 240, 242, 244, 246 and 248 at its low level output section which are each connected to a motor control 250 of one of five step motors. One of the step motors is motor 66 driving the rotation of the spindle 130, two are the motors 122 in the horizontal adjustment means 90 and 90' and the other two are the motors 94 in the vertical adjustment means 88 and 88' for positioning both spindles. Since the controls for the vertical and horizontal adjustment means for each spindle are similar, only vertical adjustment means 88' of one spindle has been shown in detail in FIG. 9. This vertical adjustment means includes a motor control 250 having an input connected to output 248 of the microprocessor and having its output connected to the step motor 94 to control the rotational position of such step motor in accordance with the vertical control signal produced by the microprocessor 184 corresponding to the distance, $Y_2$, that one end of the optimum yield axis is spaced from the reference axis 84. The step motor 94 mechanically rotates a servo valve 252 to supply fluid to a hydraulic motor 254 to rotate the shaft of such motor to a position corresponding to the position of the step motor. The output shaft of the hydraulic motor is coupled through a thrust bearing 256 to the ball screw shaft 94 of the jack means thereby rotating such screw shaft a predetermined amount. This causes the jack member 100 to travel longitudinally along the screw shaft 94 a corresponding amount. As a result the carriage supporting the log spindle 64 is moved vertically an amount, $Y_2$, to move the maximum yield axis of the log into alignment with the reference axis 84.

Before the next log is measured, the jack member 100 is returned to its zero-zero position, and this is detected by a zero-zero proximity detector 258 which supplies a detection pulse through line 260 to the low level input section of the microprocessor and causes such microprocessor to stop the step motor 94 at such zero-zero position. The proximity detector 258 may be a magnetic proximity detector which detects a ferromagnetic indicator provided on the moving jack member 100. It should be noted that the hydraulic motor 264 and servo valve 252 are provided with a feedback connection 262 which resets the valve to zero after the hydraulic motor has moved an amount corresponding to that of the step motor. As a result, the hydraulic motor stops and is maintained in the position corresponding to that of the step motor.

A limit switch 269 may be provided in a position so that its movable switch contact engages an actuator member 266 which is attached to the jack member 100 and to sleeve 104 for movement therewith. This limit switch is actuated by overtravel of the screw member 100 in either up or down direction and causes the motor control 250 to stop the step motor.

The motor control 250 is provided with an output 268 back to the low level input section of microprocessor 184 to indicate the position to which the step motor has been moved by the input control signal supplied through input line 248 to such motor control, and thereby causes the motor control to stop the step motor at a desired location. A similar control circuit is provided for the horizontal adjustment means 90 and 90'.

The rotation adjustment means for the spindle shaft 130 is similar to that of the vertical adjustment means 88' except that the hydraulic motor 254 rotates a gear which is connected by the coupling 131 to the spindle 130. It should be noted that the step motor 66 is indicated in a general way and is described as the spindle motor in the preceding figures. Of course, the shaft encoder 74 is coupled to the spindle so that its angular position and digital readout signal corresponds to the position of the spindle.

The charger sequence control system 214 also includes a lathe charger input 270 and a lathe charger output 272 connected, respectively, from the input section and output section of such system to the lathe charger represented by block 274. As randomly positioned logs are fed into the lathe charger it indicates the presence of such log by a log received signal through input line 270 to the sequence control system. The sequence control system transmits an output signal through line 272 to the charger causing the block lowering arms 26 to lower the log into the clamping position and causing the clamp arms 32, 40 and 42 to engage the log and rough center it. Another output signal on line 272 causes the spindles 64 to extend into engagement with the ends of the clamped log after the log is rough centered. A further output signal on line 272 causes the clamping arms to unclamp after the spindles engage the log.

The microprocessor 184 then produces a rotation signal at output 240 which causes the step motor 66 to rotate the spindle and also produces a scanning signal at output 186 to cause the computer 182 to begin scanning the log with the cameras 70 to measure the distances, Z, between the reference edge members 72 and the surface of the log at each of the 15° measurement positions throughout the 360° rotation of the log. The computer 182 processes the camera data and the shaft encoder signal to compute the optimum yield axis of the log and determine the x and y distances necessary to move the two spindles horizontally and vertically to cause the optimum yield axis to be in alignment with the reference axis 84. The computer then causes the microprocessor to produce corresponding $X_1$, $X_2$, $Y_1$ and $Y_2$ signals at outputs 242, 246, 244 and 248.

A later output of the sequence control system 214 on line 272 to the lathe charger 274 causes the clamp arms to reclamp the log and the spindles to be disengaged from the log after the log is positioned in alignment with the reference axis. Another output signal from the sequence controller causes the transfer arms to engage the opposite ends of the log and also causes the clamp arms to unclamp the log. The next output signal at output 272 causes the transfer arms to pivot the log from the reference axis 84 to the lathe axis 86, as indicated by operation step line 276. A lathe signal output line 278 from the sequence control system to a veneer lathe 280 causes the lathe spindles to engage the log and to begin rotation while the lathe knife is advanced to peel veneer from the log. A lathe output line 282 is connected from the lathe to the input section of the sequence control system to indicate when the lathe spindles have engaged and to cause the transfer arms to move back to the initial position. This completes one cycle of operation.

Figure 10:
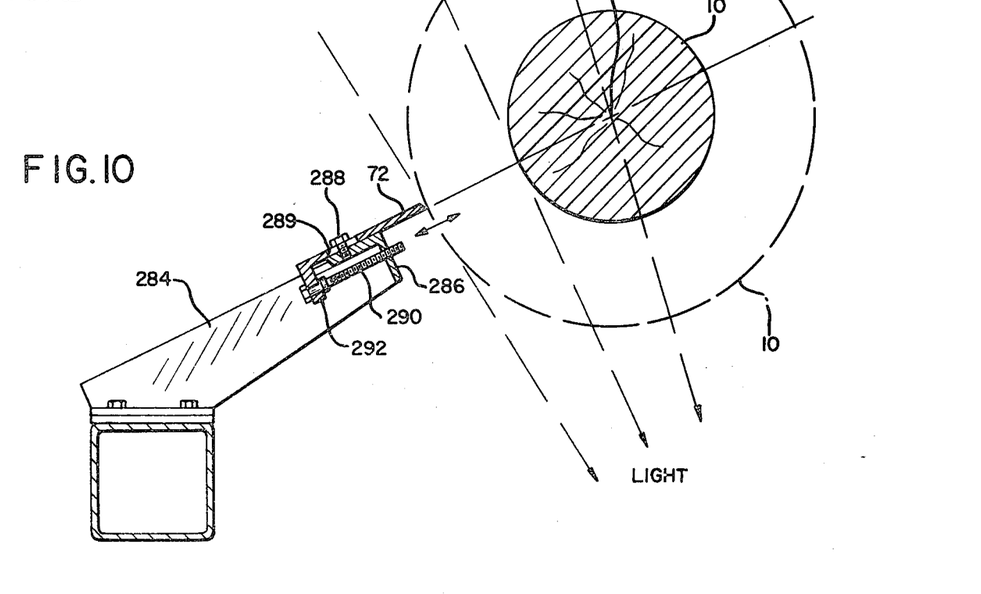
FIG. 10 is an enlarged vertical section view of one of the reference edge means taken along line 10—10 of FIG. 2.

As shown in FIG. 10, each of the reference edge members 72 may be adjustably mounted on a support arm 284. The support arm includes a horizontally offset bracket portion 286 extending to the side of the support arm and being of an L-shaped cross section. The clamping bolt 288 passes through an elongated slot 289 in the reference edge member 72 and is threaded into an aperture in the top surface of bracket 286 to clamp such reference edge member in the position to which it is adjusted. An adjustment bolt 290 is mounted to extend through an opening in a downwardly extending flange portion 292 on the back end of the reference edge member 92 so that its threaded end can be screwed through a threaded opening in the front side of the bracket 286. As a result, when the adjustment bolt 290 is screwed in a clockwise direction, the bolt advances toward the front end of the flange 286 carrying the reference edge member 72 forward with it toward the reference axis 84. Forward movement of the reference edge member 72 is guided by the slot 289 as it slides past the fixed clamp bolt 288. Conversely, counterclockwise movement of the bolt 290 causes such bolt to move backward away from the front of the bracket 286 and carries the reference edge member with it away from the reference axis. This enables each of the reference edge members 72 to set at the same predetermined distance from the reference axis and also enables logs of different diameter to be measured. Once the reference edge member is set in the proper adjusted position so that the front edge of edge member 72 is spaced from the reference axis 84 by a predetermined distance, K, the clamp bolt 88 is tightened to maintain it in that position.

Another embodiment 142' of the transfer arms is shown in FIG. 11 and includes a pivoted jaw portion 294. This pivoted jaw portion eliminates the need for reclamping of the log after small x—y adjustments of the spindles 64 of about ±1 inch since such jaw portion engages the log before the spindles are disengaged therefrom. The jaw portion 294 is pivoted to enable it to clear the spindles when the transfer arm swings from the lathe spindle position 10D to the centering spindle position 10B shown in FIG. 11. The jaw portion is pivotally mounted at the free end of the transfer arm for rotation about pivot 296. A hydraulic cylinder 298 pivots the jaw portion 294 about pivot 296 between the retracted position shown in solid lines and the extended position shown in dashed lines. One end of the cylinder is pivotally attached to a projection 300 on the transfer arm 142' and the piston of such cylinder is pivotally attached to a link 302 fastened to jaw portion 294.

When the lathe spindles have engaged the log at position 10D, the transfer arms move outward to disengage from the log and then swing back to position 10B to pick up another log. At some intermediate position, such as position 10C, the cylinder 298 pivots the jaws 294 from their extended position to their retracted position so that the jaws will clear the centering spindles 64 engaging the log at position 10B. There is enough clearance to enable x—y adjustment of the spindles 64 through about ±1 inch during centering of the log. This is sufficient adjustment for centering most logs of moderate size. After the transfer arms reach position 10B, cylinder 298 pivots the jaw portion 294 from the retracted position to the extended position. Then the arms are moved inward by cylinder 154 of FIG. 6 to cause the jaws to engage the opposite ends of the log around the spindles 64. The spindles are then disengaged from the log and it is swung by the transfer arms from position 10B to the lathe position 10D.

It will be obvious to those having ordinary skill in the art that many changes may be made in the details of the above-described preferred embodiment of the present invention without departing from the spirit of the invention. For example, it is possible that the log processing apparatus of the present invention can be used for other purposes such as charging a log shaping lathe for rounding a log or for producing rectangular beams, etc. Also, the reference edge members may be positioned above the log in a position immediately below the light sources 68, so that the camera sees the shadow of such reference edge member and measures the difference between the edge of such shadow and the edge of the log. Therefore, the scope of the present invention should only be determined by the following claims.

We claim:

1. A method of handling and measuring a log to determine the longitudinal axis of the log and center it on a reference axis, comprising:
    supporting the log adjacent to a fixed reference edge means extending longitudinally along said log and spaced a predetermined distance from a reference axis;
    transmitting light past said log through the space between the reference edge means and the side of said log to produce a transmitted light image of the gap extending from the shadow of said reference edge to the shadow of said side of said log;
    detecting said transmitted light image and producing electrical signals corresponding to the distance between said reference edge and the surface of said log at a plurality of longitudinal positions spaced along the length of said log;
    computing from said distance signals the longitudinal axis of said log for optimum production of wood products and determining the distance said longitudinal axis is spaced from said reference axis; and
    repositioning said log so that said longitudinal axis is aligned with said reference axis.

2. A method in accordance with claim 1 in which the log is rotated into different rotational positions and said distance signals are produced at each rotational position.

3. A method in accordance with claim 2 in which the log is continuously rotated during production of said distance signals and a position signal corresponding to the rotational position of the log is produced for each distance signal and used in the computing step.

4. A method in accordance with claim 2 which also includes tranferring the log from said reference axis to another position where its longitudinal axis is in alignment with a work axis spaced from said reference axis, and cutting the log into wood products while it is located at said work axis.

5. A method in accordance with claim 4 in which the log is clamped prior to being engaged by the means for causing its rotation and is unclamped prior to being rotated, said log being reclamped in position and the rotation means disengaged from said log after the log is repositioned and before it is engaged by its transfer means.

6. A method in accordance with claim 4 in which the work axis is the axis of rotation of a veneer lathe and the log is cut into wood veneer.

7. A log processing apparatus, comprising:
    support means for supporting a log;
    rotation means for engaging the opposite ends of said log while it is supported by said support means, and for rotatably supporting said log;
    positioning means for adjusting the position of said rotation means vertically and horizontally;
    sensor means for sensing said log with light transmitted past the log when it is supported by said rotation means in different rotational positions of said log to determine the longitudinal axis of the log for optimum production;
    control means for operating said positioning means in response to the output signal of said sensor means to reposition the log and align said longitudinal axis of said log with a reference axis; and
    said sensor means including a fixed reference edge means positioned adjacent the log and spaced a predetermined distance from the reference axis, photoelectric light detector means and light source means for directing light at said log and said reference edge so that a portion of said light is transmitted past the log through the space between the reference edge and said log to said detector means.

8. Apparatus in accordance with claim 7 in which the detector means produces electrical signals corresponding to the distance between said reference edge and the surface of said log and applies these distance signals to said control means.

9. Apparatus in accordance with claim 8 in which the detector means includes a plurality of detectors, each including a linear array of photosensitive diodes which are scanned electronically to take a reading.

10. An apparatus in accordance with claim 7 which also includes a transfer means for transferring the log from alignment with said reference axis to alignment with the rotational axis of a venner lathe.

11. An apparatus in accordance with claim 10 in which the transfer means includes a pair of transfer arms which are pivoted at one end and have arcuate shaped gripping means at the other end thereof for gripping the ends of the log about said optimum axis while enabling lathe spindles to engage the log ends within said gripping means.

12. An apparatus in accordance with claim 7 in which the support means includes a plurality of clamp members which clamp the log between such clamp members intermediate the ends of the log.

13. An apparatus in accordance with claim 12 in which the clamp members are pivotally mounted and are moved into clamping engagement with the log by piston actuator means.

14. An apparatus in accordance with claim 13 in which the actuator means causes the clamp means to release the log after it is engaged by said rotation means, and reclamp said log after it is rotated and repositioned until the rotation means is disengaged and a transfer means engages said log for transferring it from said reference axis to a work axis.

15. An apparatus in accordance with claim 7 in which the rotation means rotates the log during sensing and includes a pair of spindles for engaging the log and rotatably mounted in two spindle heads, and the positioning means adjusts the position of said spindle heads when operated by said control means.

16. An apparatus in accordance with claim 15 in which the positioning means includes a pair of screw means for each spindle head which moves said head horizontally and vertically.

17. An apparatus in accordance with claim 8 in which the sensor means includes a plurality of photoelectric detectors and light sources spaced longitudinally along said log and a plurality of adjustable reference edge members positioned between said light sources and detector.

18. Apparatus in accordance with claim 17 which also includes shaft encoder means connected to said rotation means for producing an electrical signal corresponding to the angular position of said log and applying this angle signal to said control means.

19. An apparatus in accordance with claim 18 in which the control means includes electronic computer means to which is applied the distance signals of said detectors and the angle signal of said shaft encoder, said computer means determining the vertical and horizontal distances that the longitudinal axis of the log is spaced from said reference axis and producing vertical and horizontal distance signals corresponding to the spacing distances which are applied to said positioning means.

20. A veneer lathe charger apparatus, comprising:
clamp means for clamping a log intermediate the ends of said log and for supporting said log in an initial position;
rotation means for engaging the opposite ends of the log while it is supported by said clamp means and for rotating said log after said clamp means releases said log;
positioning means for adjusting the position of said rotation means vertically and horizontally at opposite ends of the log to move the log from said initial position;
sensor means for sensing said log when it is supported by said rotation means in different rotational positions to determine the shape of the log;
computing means connected to said sensor means for calculating the location of the longitudinal axis of the log for optimum production of veneer;
control means for operating said positioning means in response to the output signal of said computing means to reposition the log and align said longitudinal axis of said log with a reference axis and for causing said clamping means to reclamp said log after repositioning; and
transfer means for engaging the opposite ends of the log and for transferring the log from alignment with said reference axis to alignment with the rotational axis of a veneer lathe after said clamping means releases said log.

21. Apparatus in accordance with claim 20 which includes actuation means for causing the clamp means to release the clamped log after it is engaged by the rotation means, to reclamp the log after it is rotated and repositioned into alignment with the reference axis, and to again release the reclamped log after the log is engaged by the transfer means and after the rotation means is disengaged.

22. Apparatus in accordance with claim 7 which includes a pair of transfer arms pivoted at one end and having a log gripping means at the other end thereof and means for pivoting said transfer arms to transfer the log from a position in alignment with said reference axis to a position in alignment with a work axis.

23. Apparatus in accordance with claim 22 in which the gripping means is provided on a jaw portion pivotally attached to the other end of the transfer arms and which includes means for pivoting said jaw portions on said transfer arms between an extended position where they can engage the ends of the log around the spindles and a retracted position where they can clear said spindles as the transfer arms are pivoted from said work axis to said reference axis.

* * * * *

UNITED STATES PATENT AND TRADEMARK OFFICE
CERTIFICATE OF CORRECTION

PATENT NO. : 4,197,888
DATED : April 15, 1980
INVENTOR(S) : ARTHUR L. McGEE ET AL It is certified that error appears in the above-identified patent and that said Letters Patent are hereby corrected as shown below:

Column 6, line 61, "jacket" should be --jack--.

Column 7, line 4, change "cylinder 72" to --cylinder 76--.

Column 7, line 22, change "lathe axis 84" to --lathe axis 86--.

Column 7, line 54, "is" should be --in--.

Column 15, line 8, claim 10, "venner" should be --veneer--.

Signed and Sealed this

Twenty-eighth Day of October 1980

[SEAL]

Attest:

Attesting Officer

SIDNEY A. DIAMOND

Commissioner of Patents and Trademarks